United States Patent [19]

Gawrilow

[11] 4,100,308

[45] Jul. 11, 1978

[54] PIZZA-LIKE SNACK FOOD DRY MIX AND PROCESS FOR MAKING SAME

[75] Inventor: Ilija Gawrilow, Strongsville, Ohio

[73] Assignee: SCM Corporation, New York, N.Y.

[21] Appl. No.: 706,710

[22] Filed: Jul. 19, 1976

Related U.S. Application Data

[63] Continuation-in-part of Ser. No. 618,669, Oct. 1, 1975, abandoned.

[51] Int. Cl.$^2$ .................... A21D 10/00; A21D 10/04
[52] U.S. Cl. .................................. 426/554; 426/555; 426/128
[58] Field of Search .................. 426/552, 554, 555, 89, 426/94, 95, 296, 309, 120, 128

[56] References Cited

U.S. PATENT DOCUMENTS

| | | | |
|---|---|---|---|
| 2,949,369 | 8/1960 | Zoeller et al. | 426/120 |
| 3,161,524 | 12/1964 | Opie et al. | 426/554 |
| 3,275,451 | 9/1966 | Holstein | 426/552 |
| 3,655,410 | 4/1972 | Forkner | 426/555 |

*Primary Examiner*—Jeanette M. Hunter
*Attorney, Agent, or Firm*—Richard H. Thomas

[57] ABSTRACT

There is disclosed a dry mix adapted for hydration with chilled water to provide a pourable batter which produces on baking a crust resembling traditional yeast-leavened pizza crust; a process for preparing such pourable batter, and a unitary package of one container for said dry mix in combination with one or more containers for other snack food topping ingredients are also described.

10 Claims, No Drawings

PIZZA-LIKE SNACK FOOD DRY MIX AND PROCESS FOR MAKING SAME

CROSS-REFERENCE TO RELATED APPLICATIONS

The present application is a continuation-in-part of my co-pending patent application Ser. No. 618,669 filed Oct. 1, 1975, which application is hereby incorporated by reference now abandoned.

FIELD AND BACKGROUND OF THIS INVENTION

The present invention relates broadly to a snack food in the nature of conventional pizza, and to related snack foods comprising unmodified or modified pizza dough base coated on the upper surface thereof with edible topping that is distinguished from conventional pizza only in some gustatory manner. Such alternative toppings can be uncooked, pre-cooked, or cooked as is a conventional pizza topping. If desired, for example, a baked mixture of chopped ham, diced onions and grated Swiss cheese can be applied.

Conventional pizza has been popular for some time. Generally, it refers to a large open baked pie made typically of rolled bread dough to provide a crisp yet chewy crust, with a spiced, or seasoned mixture of tomato sauce or paste, cheese and other optional ingredients including ground meat, sliced sausage or pepperoni, mushrooms, green peppers, anchovies, etc. Tomato sauce and, stretchy and chewy mild flavor cheese, such as mozzarella, are considered a necessity. While the topping ingredients are significant insofar as the overall eating qualities of a pizza, the crust stands out as an essential component to a truly acceptable pizza. No matter how tasty and fancy are the topping ingredients, they are of little value if the crust is unacceptable such as being spongy, soggy, or flaky. Accordingly, the role of the topping ingredients is complimentary to the crust.

Pizza crust varies in thickness and crispness from the very thin, crispy Neapolitan-type pizza (about ¼ inch thick) to the rather thick bread-like Romano-type pizza. Regardless of the type, the crust must not be porous so that the sauce of the topping does not penetrate the crust and weaken it. Pizza pies come in various sizes and shapes. Typically, they are made round with diameters ranging from 4 to 16 inches, and radially-cut for serving. Often, in the home or in establishments selling individual pizza pieces, the pizza pie is prepared in square or rectangular shape for efficiency and economy.

Pizza crust has been prepared traditionally from yeast-raised dough. Typically, a good deal of time is expended on the preparation of the dough which after raising still requires the additional working, rolling, stretching, and panning before dressing the surface with the requisite topping, and final baking. For commercial establishments serving such items, and for the housewife, time is of the essence. Accordingly, refrigerated and frozen doughs have become very popular for preparing pizza as well as other snack foods. Unfortunately, however, such items must be maintained in the cold state to guard against spoilage. As a matter of fact, even under proper conditions the shelf-life for such doughs is quite limited.

In order to conserve on the time required for preparing pizza pies and pizza-like snack foods, I have found a dry mix which is most suitable for this purpose. My dry mix is adaptable for mixing with chilled water to provide a pourable batter which bakes to a crust surprisingly comparable to the traditional yeast-leavened crust.

BRIEF STATEMENT OF THE INVENTION

Accordingly, the present invention is directed to a novel dry mix suitable for the preparation of pizza-like snack foods, and characterized by providing, on baking, a crust resembling a traditional yeast-raised pizza crust.

Another aspect of the invention is a pourable batter prepared from hydrating the dry mix of the invention with chilled water (33°–45° F.)

A further aspect of the invention is a unitary package comprising a container of the dry mix and one or more containers of snack food topping material gaged in volume to provide sufficient coverage of the crust resulting from the hydration and baking of said dry mix.

DETAILED DESCRIPTION OF THE INVENTION

The dry mix of the present invention consists essentially of the following dry ingredients (in percent by weight):

| Ingredient | Percent |
| --- | --- |
| Flour | 65 – 80 |
| Baking Powder | 0.5 – 4 |
| Salt | 0 – 4 |
| Whey Solids or NFMS | 2 – 7 |
| Sweetener or Browning Agent | 12 – 22 |
| Fat | 0.5 – 5 |
| Soy Flour | 0.5 – 3 |
| Powdered Egg Whites | 0.5 – 3.5 |
| Flavoring Agent | 0 – 1 | such that the ingredients are adjusted to provide a total of 100%. NFMS refers to non-fat milk solids or skim milk solids (SMS).

All the ingredients utilized in the preparation of the dry mix are available commercially. Flour refers basically to bread flour with wheat bread flour is preferred for efficiency and economy. I have found that certain flours perform superior to others based on their protein content. For example, cake flours are not adequate for the purpose of my invention and can be rectified possibly by incorporating into them additional amounts of protein as in the form of protein concentrate or vital gluten. Bread flours perform better than cake flours because of the former's high protein content, particularly when such protein content is about 11.5 to about 13.5% by weight of flour. Of the wheat bread flours used, I preferred triticale or steam wheat flour. The broad range for the flour is 65 to 80%, but the range 68 to 77% is most preferred.

Baking powder is used for its chemical leavening action. The broad range is 0.5 to 4%, and preferably 1 to 3%. Of course, any chemical leavening agent approved for food use such as sodium bicarbonate would be acceptable. Salt is used in amounts subject to taste (broadly 0 to 4% and preferably 2 to 3%) although it functions as crust toughening agent. Salt is generally sodium chloride, iodized sodium chloride or mixture of sodium chloride and other alkali metal chlorides. Whey solids (Non-fat milk solids or alphasoy protein solids) in the amounts of 2 to 7%, and preferably 3 to 5%, are incorporated to provide the final crust with nutritious values, enhanced browning effect and bodying and texturizing properties. Skim milk fat solids (SMFS) can be used for the same purpose. Sweeteners such as dextrose, sucrose, or corn syrup solids are provided for nutritional values, taste, and browning properties. Generally, 12 to 22% by weight of sweetener is incorporated into the dry mix, but 15 to 18% often is quite satisfactory. For soy flour and powdered egg whites, the preferred rough is 1–3%.

As to the fat ingredient of the dry mix, it represents 0.5 to 5% by weight, preferably 2 to 3%. The fat is basically an edible triglyceride fat which can be derived from vegetables, animals or nuts. For convenience, I prefer to use hydrogenated vegetable oil with iodine value in the range of 80 to 130, and typically with i.v.'s of 105 to 115. Hydrogenated vegetable oil can be hydrogenated soybean oil, cottonseed oil, corn oil, rapeseed oil, sunflower seed oil, sesame seed oil, safflower oil and mixture thereof. Fats of animal origin can be used but care should be taken to avoid development of any rancidity in the dry mix.

It is preferred that the fat be in the liquid state. Solid or plastic fats tend to reduce the flowability of the batter. The liquid oil functions as a binder for the mix as well as a source of nutrition and texturizing agent for the crust. Solid fat in the form of free flowing particulates (beads) can be used effectively in the dry mix without noticeable deleterious effect. Ingredients such as soy flour and powdered egg whites are added for the purpose of enhancing the protein content of the dry mix and improving its ability to form pourable batter when it is combined with chilled water. The flavoring agent is an optional ingredient added to provide the dry mix with desirable flavors such as yeast or the like.

In preparing the dry mix of the present invention, the naturally dry ingredients, i.e., bread flour including soy flour, leavening agent, sweetener, salt, whey or milk solids and powdered egg whites are combined and intimately mixed prior to introducing the fat (oil) which is incorporated subsequently to form the dry mix. Actually, the mixing operation of the dry ingredients and the oil is not critical and can be effected in any convenient manner. Should beaded fat (free flowing particulates) be used then all the ingredients are mixed simultaneously.

Other ingredients can be added to the mix for flavor and/or other purposes. For example, different types of sweeteners can be added to enhance browning; soy alpha proteins can also be added or substituted for the whey or milk solids. Should it be desired to adjust the caloric or nutritional content of the dry mix, the sweetener, can be made up from artificial sweeteners or other sugars, such as glucose, fructose, maltose, corn syrup solids of various dextrose equivalent (16-94 D.E.) or sucrose. Further, flavorants and/or colorants can be incorporated into the dry mix to accent certain flavors and colors. Yeast flavor is often desirable to give the baked product the flavor and taste most associated with freshly baked bread. Thus yeast is added either in the dry form to the dry mix or to the chilled water to prepare the pourable batter. It should be realized, however, that the yeast would not be active because of the low temperature. Of course, yeast brew can be added to the chilled water with the same result. Dried, dehydrated or powdered eggs, spices, herbs, colorants and other seasonings can be added to the dry mix to provide some form of a desirable crust. For example, dehydrated eggs will increase the nutritional value of the crust and make it tough and somewhat hard. Pizza flavoring and yellow colorants would contribute favorably to the taste of the baked product.

As to the preparation of the pourable batter, it is essential that the dry mix is combined with chilled water (33°–45° F.) and preferably 35°–40° F. In fact, this is one of the remarkable features of the present invention, i.e., the ability to make a pourable batter from the foregoing dry mix by the addition of chilled water, wherein said pourable batter would bake into a crust resembling the traditional yeast-raised pizza crust. To provide the desirable crust, the dry mix is added to water or vice versa to the extent that the resulting pourable batter is about 50 to 70% by weight dry mix and about 30 to 50% by weight chilled water. A typical pourable batter is about 60% by weight dry mix and 40% water.

It was quite surprising to find how quickly I was able to prepare the pourable batter from the combination of my dry mix and chilled water (60 parts dry mix and 40 parts chilled water). For example, to prepare a pourable batter sufficient to make a crust for a 12-inch pizza pie, I did not require the use of a high sheer mixing equipment such as an electrical mixer. All I needed was a wooden spoon to combine the dry mix and water and end up with a homogeneous pourable batter. Of course, the ability to prepare the pourable batter in such a simple matter is a great saving in time and effort to the housewife as well as to the proprietor of a commercial establishment. Without being bound by theory, I believe that the reason the batter becomes so pourable is attributable to the use of the chilled water (33°–45° F.) to my novel dry mix. Cold water would not hydrate flour as quickly as water kept at normal room temperature or higher. Accordingly, stickiness from the gluten portion of the flour is not developed in this pourable batter as rapidly as normally expected, and flowability of the batter is maintained until poured on the baking surface or into a baking pan.

On repeated attempts I was able to have a medium-size pizza ready to bake in a period of less than five minutes starting with the dry mix and preparing the batter, spreading the same and placing the pizza topping on the spread batter including cheese, tomato sauce and sliced sausage pieces.

The dry mix of the present invention is quite stable and has a long shelf-life. Advantageously it can be packaged into a first container in combination with another one or more containers to form a unitary package wherein said other containers contain traditional pizza topping material gaged in volume to provide a suitable topping layer over the crust resulting from the hydration and baking of the dry mix contained in said first container. Depending on the contents which can vary to accommodate various desirable sizes of pizza, the preparation takes but a few minutes. Of course, the hydration should be effected with chilled water.

In order that the present invention is better understood, the following examples are provided for illustrative purposes and should not be contsrued as limiting the scope of the present invention. All parts and percentages are given by weight and all temperatures are given in degrees Fahrenheit unless specified otherwise.

EXAMPLE I

A dry mix was prepared from the following dry ingredients:

| Ingredient | Parts By Weight |
| --- | --- |
| Wheat, bread flour | 79.3 |

-continued

| Ingredient | Parts By Weight |
|---|---|
| Baking Powder | 2.80 |
| Salt | 3.74 |
| Whey Solids | 4.67 |
| Hydrogenated Vegetable Oil Durex 500, (I.V. 108) | 4.69 |
| Sweetener (13 Parts Frodex 24 and 4 parts Cerelose 2001) | 17.0 |
| Soy Flour | 1.0 |
| Powdered Egg Whites | 1.7 |

The dry ingredients were mixed thoroughly to make a master batch. 540 g. were weighed out to which 360 g. of water (40° F.) was added. The water-dry mix combination was stirred with a wooden spoon for about one minute and a flowable, pourable and easily spreadable batter was produced. This pourable batter was then transferred onto a baking tray, which transfer required little resistance in spreading the batter to conform to the tray. Parmesan cheese, tomato sauce, seasonings, and other ingredients used in pizza toppings were spread over this spread batter. Surprisingly, the spread batter had such a surface tension or cohesion that the topping ingredients did not sink or get soaked into the batter. The entire operation from hydrating the dry mix with water to the point where the baking tray was to be placed in the oven took approximately five minutes. The tray was then placed in an oven and baked at 425° F. for 20 minutes after which it was removed for slight cooling followed by cutting into small pieces. The pizza product was of excellent quality having the desirable chewy and crisp with the necessary texture and body to keep the pizza topping on the baked crust while eating.

For most snack foods taste and eating qualities are often difficult to measure or evaluate because of the subjective nature of such properties. However, taste panels comprising experienced and lay people have been used to assess the qualities of the crust produced according to the foregoing and following Examples 2-4. Results from such panels have shown that the crust presented in the form of pizza (cheese and tomato sauce and seasoning) was considered of comparable overall quality to pizzas obtained from pre-cooked frozen pizzas or those obtained from pizza establishments.

EXHIBIT II

The dry mix used in Example I was utilized again, but the water content was increased to about 45% by weight. The water temperature was 35° F. After the pourable batter was formed with simple mixing procedure, some dry yeast was added for flavor and the batter was poured on a tray as described in Example I (and topped with the normal pizza topping and baked at 425° F. for 20 minutes. The resulting crust was not distinguishable from that produced in Example I, except for some yeast flavor taste. However, the chewiness, body, texture, browning properties of the crust were substantially the same as that shown in Example I.

Of course the addition of yeast at temperatures lower than room temperature does not particularly assist in any leavening action. In effect, the mix of the present invention relies entirely on baking powder for the leavening.

EXAMPLE III

For the preparation of a crust having a slightly different taste, chilled whole or skimmed milk (33°-45° F.) can be substituted for the chilled water for substantially the same effect. The resulting crust can serve as the substrate for topping material including pizza toppings. While milk is mostly water, the additional fat, protein and sugar tend to give the baked crust a slightly different taste.

EXAMPLE IV

The dry mix of Example I was used again to produce crusts for other snack foods having meat or cheese topping or meat fillings such as frankfurter type meats or the like. In this manner, small-size Vienna type sausages were dipped in the pourable batter of Example I and placed onto a baking tray and additional pourable batter was poured over each sausage to engulf the same and cover it completely. The tray (12 by 24 inches) containing a dozen Vienna sausages was placed in an oven and baked in at 400°-425° F. for about 15 minutes. A very appetizing type of hors d'oeuvre was produced. The batter, though flowable and pourable, adhered to the Vienna sausage very readily. Thus additional batter would not be necessary for hors d'oeuvre requiring less bread-like crust.

EXAMPLE V

A dry mix was prepared from the following ingredients:

| INGREDIENT | % BY WEIGHT |
|---|---|
| Wheat Bread Flour | 70 |
| Frodex 24 (Corn Syrup Solids - 24 D.E.) | 13 |
| Cerelose 2001 (Dextrose 94 D.E.) | 4 |
| Whey Solids | 4 |
| Baking Powder (Fleischman) | 3 |
| Salt | 1.5 |
| Soy Flour | 0.9 |
| Powdered Egg Whites | 1.6 |
| Durex 25 (liquid fat hydrogenated vegetable oil) | 2 |

The dry ingredients were mixed thoroughly prior to introducing the liquid fat which was blended into the dry mixture resulting in a representative dry mix in accordance with the present invention. 390 grams of chilled water (40 F.) was added then to 610 grams of the dry mix (ratio of 1.6 parts of mix 1 part of chilled water). The combination of the water and dry mix was stirred with a wooden spoon for a short period of time (about a minute) after which a flowable, pourable and easily handlable and spreadable batter was produced. This pourable batter was transferred equally onto two baking trays (10 × 15). The batter was easy to transfer and conform to the dimensions of the trays. (If very thick crust is desired, the batter amount placed onto the tray can be adjusted accordingly.) Mozzarella cheese in small pieces was spread over the batter which was then covered by a pizza sauce comprising tomato paste, seasonings, herbs, and other ingredients. The cheese and pizza sauce layer was then covered by pepperoni slices for one tray and Italian sausage for the other. The trays were placed in an oven and baked at 425° F. for about 20 minutes. After baking, the pizza pies were cooled slightly and cut into small pieces for serving. The pizza product was excellent in quality having all the desirable properties associated with yeast-raised pizza crust such as chewyness, toughness, and crispness. The pizza topping did not sink or soak into the crust.

Taste panels compared the pizza pies produced above with other commercially available pizza products. Inasmuch as taste is subjective in nature and not easy to measure quantitatively, the majority of taste panelists testing the pizza product of the above example found it quite acceptable.

In order for the topping to exert minimal effect on the taste quality of the final product, a batter prepared in the same manner described above was baked at 400° F. for about 20 minutes to produce a simple crust. A conventional yeast-raised pizza crust was also prepared. The two crusts were compared for overall eating qualities and for individual properties such as texture, toughness, chewyness and crispness with the result that the crust prepared from the present invention was very close in overall eating qualities to the conventional pizza crust. Some differences in the individual properties were observed, however. None of said differences were significant to affect the overall eating qualities.

The importance of the chilled water to the pourability of the batter was checked through viscosity measurements of various batters prepared with water at different temperatures. In all cases the batters were prepared from one part water and 1.6 parts dry mix. Utilizing water at 70° F. gave a batter's viscosity of 170,000 cps (Brookfield Viscometer with Westpaul Stand using Spindle #3). At 40° F., however, the viscosity was 145,000 cps. At 90° and 100° F., the viscosities measured 205,000 and 308,000 cps, respectively. Thus it can be concluded easily that addition of warm water or ambient water to the dry mix contributes significantly to batters of higher viscosities, i.e., less tendency to flow or pour.

To provide a crust most resembling traditional yeast-leavened pizza crust I have found it important to utilize flours of relatively high protein content. In fact, my dry mix should contain 9–14% by weight protein, derived from all the various ingredients. However, to provide a pourable batter it is often necessary to reduce the protein content such as cake flours (normally about 6% protein content). For the present invention I have found that the pourability of the batter produced from my dry mix and chilled water is not affected. In fact, I have used wheat bread flours having protein content of up to 13.5% by weight. Generally, wheat bread flours having protein content of about 11.5 to about 13.5% are used to produce the desired crust.

I claim:

1. Dry mix adapted for hydration with water to provide a pourable batter which when poured onto a horizontal surface and baked has a chewyness, toughness and crispness resembling traditional yeast-leavened pizza crust consisting essentially of: 65 to 80% flour, 0.5 to 4% chemical leavening agent, 0 to 4% salt, 2 to 7% of solids selected from whey or milk solids, 12 to 22% of sweetener, 0.5 to 5% of fat, 0.5 to 3% of soy flour, 0.5 to 3.5% of powdered egg whites, and 0 to 1% of flavoring agent, wherein said percentages are based on the weight of the mix; said flour being wheat bread flour having a protein content by weight in the range of about 11.5–13.5%.

2. Batter pourable on a horizontal surface, bakable after said pouring to provide a crust having chewyness, toughness and crispness resembling yeast-leavened pizza crust, which batter consists essentially of a mixture of 50 to 70% by weight of the dry mix described in claim 1 and 30 to 50% by weight of chilled water (33° to 45° F.).

3. A process for the convenient preparation of a crust having chewyness, toughness and crispness resembling traditional yeast-leavened pizza crust, which comprises the steps of combining the dry mix of claim 1 with chilled water to form a pourable batter; applying said batter as a layer onto a baking surface; and baking said layer to thereby form a crust resembling traditional yeast-raised pizza crust.

4. The process of claim 3 wherein pizza topping material is applied to the upper surface of said layer for baking therewith.

5. In combination a container of the dry mix of claim 1 and one or more containers of pizza topping material gaged in volume to top in traditional pizza fashion the crust resulting from the hydration and baking of said dry mix, said containers being assembled in a unitary package.

6. The dry mix of claim 1 wherein the flour is 68–77%, leavening agent is 1–3%, salt is 2–3%, whey or milk solids are 3–5%, sweetener is 15–18%, fat is 2–3%, soy flour is 1–3%, powdered egg whites 1–3%, and 0.5% of a flavoring agent.

7. The dry mix of claim 1 wherein the sweetener comprises corn syrup solids of 16 to 94 dextrose equivalents.

8. The process of claim 3 wherein the pourable batter is formed from a mixture of 50 to 70% dry mix of claim 1 and 50 to 30% of chilled water (33° to 45° F.).

9. The process of claim 8 wherein the batter is formed from 40 parts chilled water and 60 parts dry mix of claim 6.

10. The dry mix of claim 1 wherein the protein content is about 9–14%.

* * * * *

UNITED STATES PATENT AND TRADEMARK OFFICE
CERTIFICATE OF CORRECTION

PATENT NO. : 4,100,308
DATED : July 11, 1978
INVENTOR(S) : Ilija Gawrilow

It is certified that error appears in the above-identified patent and that said Letters Patent are hereby corrected as shown below:

Column 4, line 57, change "contsrued" to --construed--. Column 5, line 31, after "crisp" insert --crust--; line 45, change "EXHIBIT II" to --EXAMPLE II--. Column 6, line 49, change "(10 X 15)" to --(10" x 15")--.

Signed and Sealed this

Nineteenth Day of December 1978

[SEAL]

Attest:

RUTH C. MASON
*Attesting Officer*

DONALD W. BANNER
*Commissioner of Patents and Trademarks*